INVENTORS
HOWARD P. GARDNER
BARON G. ROBERTS

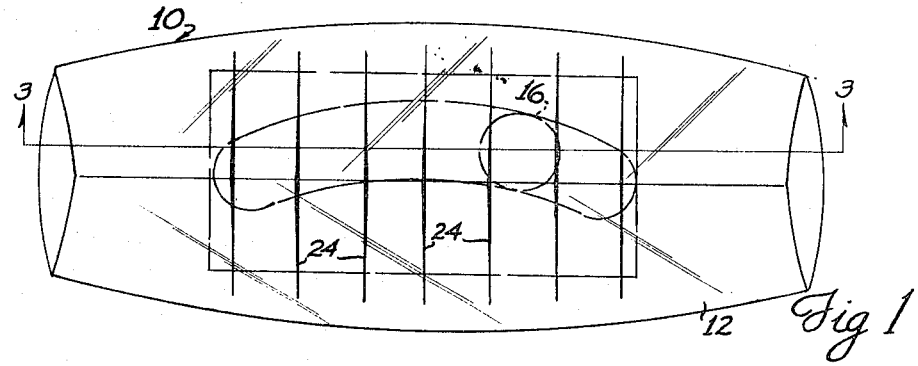
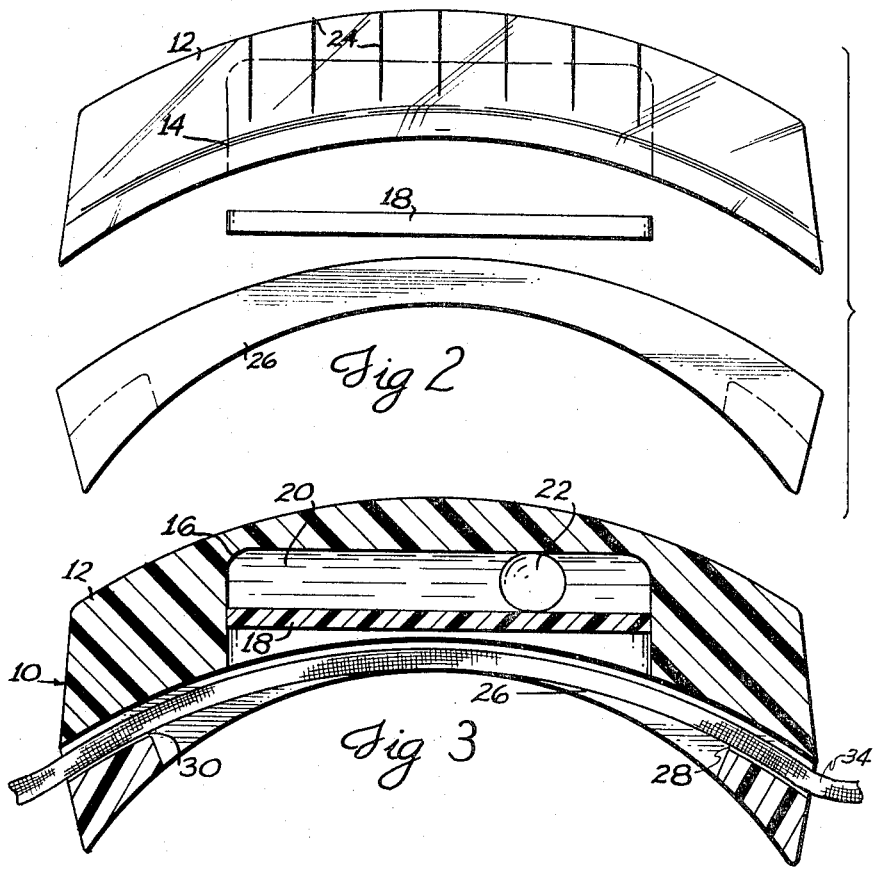

ATTORNEYS

May 21, 1968 H. P. GARDNER ET AL 3,383,772
ROTATIONAL ATTITUDE INDICATOR
Filed Aug. 25, 1966 3 Sheets-Sheet 3
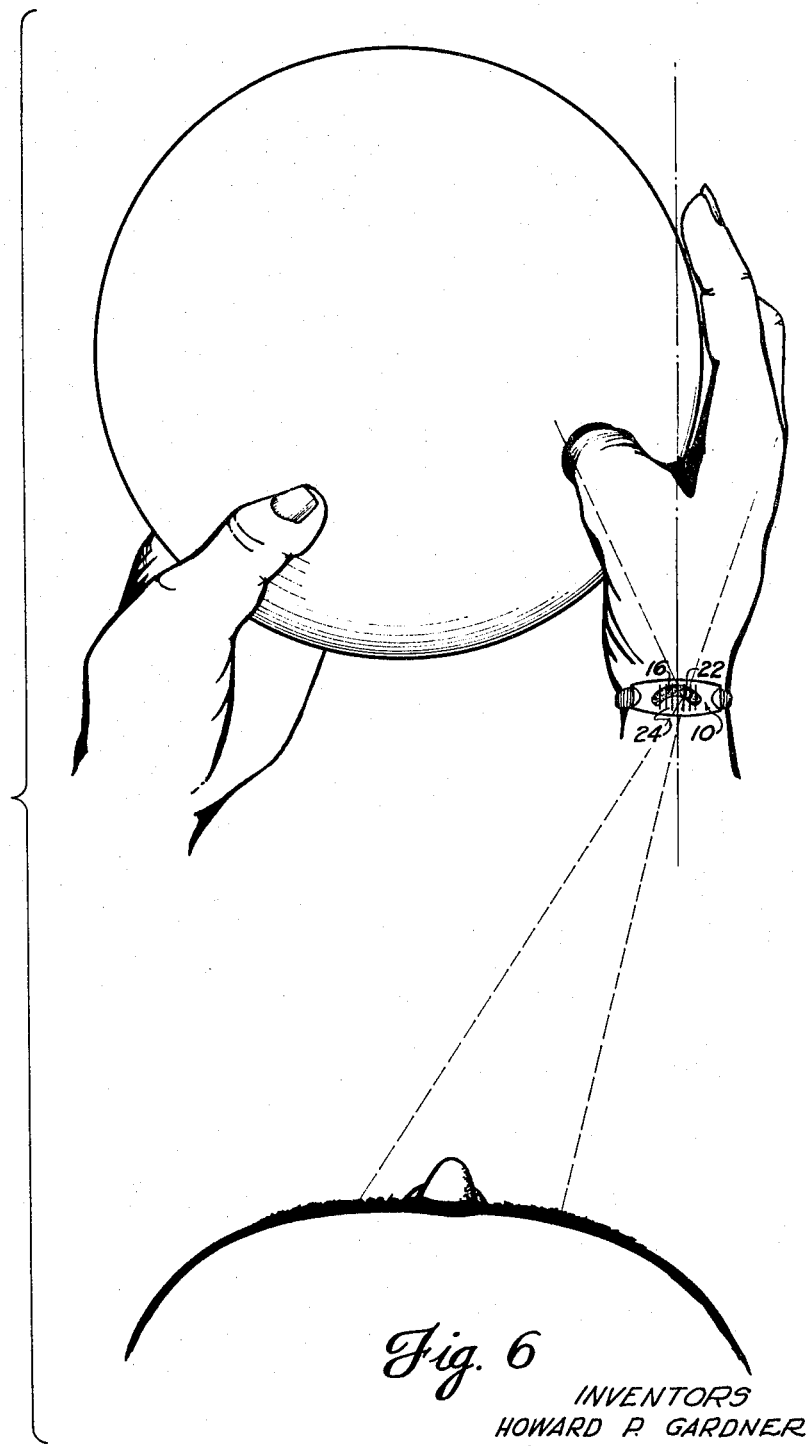
INVENTORS
HOWARD P. GARDNER
BARON G. ROBERTS
Newton, Hopkins,
Jones & Ormsby
ATTORNEYS

United States Patent Office 3,383,772
Patented May 21, 1968

3,383,772
ROTATIONAL ATTITUDE INDICATOR
Howard P. Gardner and Baron G. Roberts, Atlanta, Ga., assignors to Accurmatic Corporation, Atlanta, Ga., a corporation of Georgia
Continuation-in-part of application Ser. No. 403,156, Oct. 12, 1964. This application Aug. 25, 1966, Ser. No. 578,115
4 Claims. (Cl. 33—207)

ABSTRACT OF THE DISCLOSURE

A device for measuring the amount of rotation of one's forearm comprising a transparent elongate vertically arced housing, a horizontally arced bubble indicator within the housing and means for securing the housing to the wrist of a user. A method of performing a sport comprising recognizing the rotation of one's wrist before and after participation by means of observing a wrist mounted rotational attitude indicator.

---

This application is a continuation-in-part of copending application Ser. No. 403,156, filed Oct. 12, 1964, now abandoned.

The present invention relates to a rotational attitude indicator, and more particularly to a wrist-mounted rotational attitude indicator for use by bowlers, golfers, archers, and the like.

In many sports, the rotational attitude of one or both hands is crucial to an enjoyable and efficient participation. Most amateurs play only enough to realize this fact but never succeed in establishing proper rotation and recognizing it. Professional participators acquire a knowledge of proper rotation through years of practice and are capable of establishing that proper rotation instinctively each time they participate in their sport. The amateur, however, does not have the time nor the ability to spend years practicing a sport. Consequently, each amateur is plagued by inconsistency, and inaccurateness.

It is therefore an object of the present invention to provide a rotational attitude indicator to be used primarily by amateur or unskilled practitioners of a sport and which will provide a ready reference as to what relative degree of rotation of the hand or hands is being employed with each participation in the sport.

Another object of the invention is to provide an indicator which can be worn on the wrist of one hand by the person participating in a sport without interfering with the use of that hand in the participation of the sport.

Another object of the invention is to provide a rotational attitude indicator which may be used to set the hands in the proper rotational attitude before each participation in a sport.

A further object of the invention is to provide a rotational attitude indicator which is simple and economical in construction, inexpensive in cost, and easy to use.

In accordance with one embodiment of the invention, the rotational attitude indicator comprises a relatively small transparent housing having an arcuate spirit level therein and means for securing the housing to one's wrist at the base of the thumb. The indicator allows the user to determine the most suitable rotational attitude of his wrist at the instant of executing movements required for a sport. By recognizing an approprite rotation of the wrist, the user may obtain a suitably consistent and accurate participation in the sport.

Other objects, features and advantages of the invention will become apparent upon the following description, taken in conjunction with the accompanying drawing, in which:

FIG. 1 is a top planar view of the rotational attitude indicator of the present invention;

FIG. 2 is a side elevational exploded view of the rotational attitude indicator of the present invention;

FIG. 3 is a side elevational section on line 3—3 of FIG. 1;

FIG. 6 is a perspective view illustrating the rotational attitude indicator of this invention in proper use.

Figure 4:
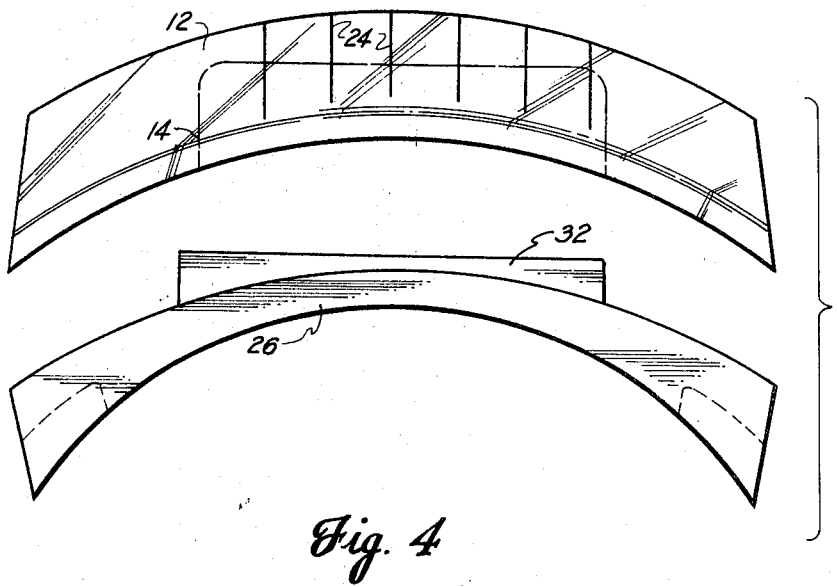
FIG. 4 is a side elevational exploded view of an alternative embodiment of the rotational attitude indicator of the present invention.
Figure 5:
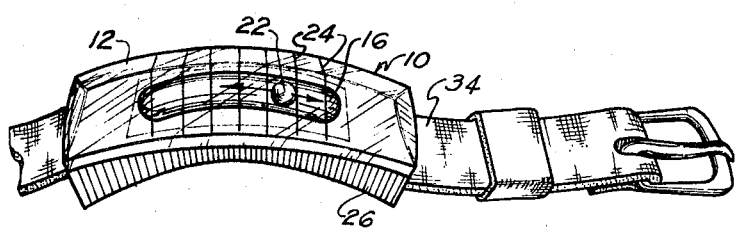
FIG. 5 is a perspective view of the rotational attitude indicator of the present invention.

Upon particular reference to FIGS. 1 through 5 of the drawing, it will be noted that the rotational attitude indicator 10 includes a transparent, vertically arced, rectangular housing 12 of triangular cross-section. Formed within housing 12 is a rectangular depression 14 intermediate of the sides and ends of housing 12 and opening throughout its length along the undersurface of housing 12. A longitudinally arcuate channel 16 is also formed in housing 12 above depression 14 and coextensive in length with depression 14. The channel 16 opens throughout its length along the upper surface of the depression 14 and arcs within one horizontal plane. Closing and hermetically sealing the channel is a sealing plate 18 of rectangular shape sufficient to tightly fit within depression 14. Plate 18 is placed against the upper surface of depression 14 and adhesively sealed thereto. A liquid 20 of low viscosity is injected into channel 16 just before it is closed and sealed by plate 18. This liquid 20 fills the channel 16 except for a gaseous bubble 22 left therein to freely move within channel 16. Thus, there is created a longitudinally arced spirit level within the housing which is responsive to and indicative of rotational movement of the housing when it is positioned so that the channel 16 arcs vertically within a plane other than the horizontal.

Formed within the top surface of housing 12 is a peripheral scale 24 made up of a series of parallel calibrations normal to the longitudinal axis of housing 12. Scale 24 is disposed in juxtaposition with channel 16 providing thereby indicia for recognizing and noting the amount of rotation of the housing by means of observing the location of bubble 22 relative to scale 24.

Housing 12 is formed into triangular cross-sectional shape so that the oblique observation of bubble 22 is facilitated. Further, the series of parallel calibrations of scale 24 extend down the sides of housing 12 far enough to provide indicia when observing the housing 12 from an oblique angle. Housing 12 may be constructed of any suitable transparent material such as thermoplastic. Liquid 20 consists of any suitable liquid commonly used in level indicating devices and should be colored. These liquids usually are of low-viscosity so that movement of the level indicating device is followed by immediate movement of the bubble.

A base 26 is formed to coextend with and complement housing 12 which is placed thereon. In this embodiment, housing 12 is affixed to base 26 by means of a suitable adhesive; however, our invention further encompasses a housing 12 which is removably secured to base 26 by temporary or adjustable means so that the housing may be removed from the base and used by another or adjusted on the base to suit the needs of the user. The means of attachment, in this alternative embodiment, are conventional and therefore are not shown in these drawings. The ends of base 26 are formed so as to create passageways 28 and 30 when housing 12 is placed upon base 26. In this embodiment, passageways 28 and 30 extend from each end of base 26 to a pair of openings intermediate of the ends of base 26 and spaced from each other. An alternative arrangement would be a single passageway extending through base 26 from one end to the other.

Upon reference to FIG. 4, it will be noted that base 26 is shown with a rectangular protrusion 32 designed to tightly and hermetically seal channel 16 in the same fashion as plate 18. FIG. 4 is thus one species of my invention, FIG. 2 and 3 of which are another; all are equally within the scope of my invention.

A fastenable strap 34 provided with a buckle at one end and apertures at the other is positioned within passageways 28 and 30 so that strap 34 may be used to secure the indicator 10 to a user's wrist. Other suitable means for securing the indicator 10 to one's wrist may be employed; one such means would be an annular elastic band of a circumference sufficient to tightly secure indicator 10 on one's wrist.

FIG. 6 depicts the indicator 10 properly positioned on a user's wrist. This position should be on the wrist at the base of the thumb with the central calibration substantially aligned with the mid-line between thumb and forefinger. If the indicator is to be considered with the forearm and hand above a horizontal plane, the channel 16 should arc so that its ends are closest to the elbow; if the forearm and hand are to be below the horizontal plane at the moment of consideration of the indicator 10, the channel 16 should arc so that its ends are closest to the hand. The indicator 10 will not function properly with the hand and forearm at or near the horizontal position because, in this position, the slightest rotation of the wrist will create a high-point at one end of channel 16. Therefore, the bubble 22 would have only three positions available within channel 16, i.e. midway or at either end of channel 16. With channel 16 arcing vertically so that its ends are its lowest portions, a rotation of the wrist will cause the establishment of a plurality of high-points along channel 16 as the channel is, in effect, rotated by means of rotation of the housing 12. Bubble 22 may proceed to each of these high-points as an indicator of a certain amount of rotation of the wrist. FIG. 6 shows the indicator in position for consideration when the hand and forearm are above a horizontal plane. Thus, with proper positioning of the indicator 10, rotation of the wrist will cause a corresponding and immediate movement of bubble 22 relative to the movement of the wrist and indicative thereof. Therefore, one may rotate the wrist a set distance, as shown by the indicator, lock the wrist, and perform the movements required for the sport. Thereafter, the user may assess the results and effect the required changes in rotation of the wrist, while knowing that an accurate adjustment of the wrist may be accomplished.

FIG. 6 shows the indicator 10 in use while grasping a bowling ball. In this sport, one should grasp the ball, rotate the wrist to the proper degree of rotation as evidenced by the bubble 22 relative to the scale 24, lock the wrist, and bowl the ball over a pre-selected marker on the lane. The results should be ascertained and corrections made in the rotation of the wrist.

It should be understood that the indicator 10 may be placed on other areas of the wrist as long as it is left in that position throughout the participation in the sport and is readily observable in that position. Of course, no matter where the indicator is placed, the above mentioned requirements as to direction of the arc of the channel 16 must be always followed.

It will be apparent that the particular embodiment of the invention shown and described herein is of an illustrative character and that various modifications in construction and arrangement of parts may be made within the spirit and scope of the following claims.

Having thus described the invention, what is claimed and desired to be secured by Letters Patent is:

1. Wrist-mounted rotational attitude indicator for measuring the amount of rotation of a user's forearm and hand during participation in a sport comprising:
 (a) a transparent elongate housing having a concave undersurface and a top surface, said housing being arcuate throughout its length;
 (b) an elongate depression formed in said undersurface, said depression having an upper surface;
 (c) an arcuate channel formed in said upper surface, said channel arcing within a plane normal to the arc of said housing and constituting a segment of a circle;
 (d) a liquid filling said channel except for a gaseous bubble left therein to be freely movable in said channel;
 (e) a sealing plate disposed within said depression and closing said channel;
 (f) an elongate arcuate base upon which said housing is placed; and
 (g) means for mounting said base upon a user's wrist; said top surface of said housing having thereon a scale disposed in juxtaposition with said channel.

2. Wrist-mounted rotational attitude indicator comprising:
 (a) a transparent elongate housing having a concave undersurface and a substantially triangularly shaped top surface, said housing being arcuate throughout its length;
 (b) a substantially rectangularly shaped depression formed in said undersurface, said depression having an upper surface;
 (c) an arcuate channel formed in said upper surface, said channel arcing within a plane normal to the arc of said housing and constituting a segment of a circle;
 (d) a liquid filling said channel except for a gaseous bubble left therein to be freely movable in said channel;
 (e) a sealing plate disposed within said depression and closing said channel;
 (f) an elongate arcuate base upon which said housing is placed; and
 (g) means for mounting said base upon a user's wrist; said top surface of said housing having thereon a scale disposed in juxtaposition with said channel.

3. Wrist-mounted rotational attitude indicator comprising:
 (a) a transparent elongate housing having a concave undersurface and a substantially triagularly shaped top surface, said housing being arcuate throughout its length;
 (b) a substantially rectangularly shaped depression formed in said undersurface, said depression having an upper surface;
 (c) an arcuate channel formed in said upper surface, said channel arcing within a plane normal to the arc of said housing and constituting a segment of a circle;
 (d) a liquid filling said channel except for a gaseous bubble left therein to be freely movable in said channel;
 (e) an elongate arcuate base upon which said housing is placed, said base having a raised protrusion constructed and arranged to close said channel when said housing is placed upon said base; and
 (f) means for mounting said base upon a user's wrist; said top surface of said housing having thereon a scale disposed in justaposition with said channel.

4. Wrist-mounted rotational attitude indicator for measuring the amount of rotation of a user's forearm and hand during participation in a sport comprising:
 (a) a transparent elongate housing having a concave undersurface and a top surface, said housing being arcuate throughout its length;
(b) an elongate depression formed in said undersurface, said depression having an upper surface;
(c) an arcuate channel formed in said upper surface, said channel arcing within a plane normal to the arc of said housing and constituting a segment of a circle;
(d) a liquid filling said channel except for a gaseous bubble left therein to be freely movable in said channel;
(e) an elongate arcuate base upon which said housing is placed, said base having a raised protrusion constructed and arranged to close said channel when staid housing is placed upon said base; and
(f) means for mounting said base upon a user's wrist; said top surface of said housing having thereon a scale disposed in juxtaposition with said channel.

References Cited

UNITED STATES PATENTS

| | | | |
|---|---|---|---|
| 2,767,483 | 10/1956 | Sauer | 33—207 |
| 3,269,729 | 8/1966 | Morrison | 33—212 X |
| 967,258 | 8/1910 | Stamm | 33—207 |
| 2,543,139 | 2/1951 | Veit | 33—207 |
| 2,752,693 | 7/1956 | Wullschleger | 33—211 |
| 2,816,368 | 12/1957 | Salopek | 33—207 |
| 2,871,573 | 2/1959 | Schenker | 33—207 |

SAMUEL S. MATTHEWS, *Primary Examiner.*